United States Patent
Zhang et al.

(10) Patent No.: US 12,003,901 B2
(45) Date of Patent: Jun. 4, 2024

(54) PON MULTI-CHANNEL BINDING TRANSMISSION METHOD, PON NODE AND STORAGE MEDIUM

(71) Applicant: ZTE CORPORATION, Shenzhen (CN)

(72) Inventors: Weiliang Zhang, Shenzhen (CN); Liquan Yuan, Shenzhen (CN); Yong Guo, Shenzhen (CN); Jun Shan Wey, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 10 days.

(21) Appl. No.: 17/789,754

(22) PCT Filed: Nov. 3, 2020

(86) PCT No.: PCT/CN2020/126169
§ 371 (c)(1),
(2) Date: Jun. 28, 2022

(87) PCT Pub. No.: WO2021/135625
PCT Pub. Date: Jul. 8, 2021

(65) Prior Publication Data
US 2023/0048590 A1 Feb. 16, 2023

(30) Foreign Application Priority Data
Dec. 31, 2019 (CN) .......................... 201911424432.4

(51) Int. Cl.
*H04Q 11/00* (2006.01)
*H04L 5/00* (2006.01)
(52) U.S. Cl.
CPC ....... *H04Q 11/0067* (2013.01); *H04L 5/0044* (2013.01); *H04Q 11/0005* (2013.01); *H04Q 2011/0086* (2013.01)

(58) Field of Classification Search
CPC ............. H04Q 11/0067; H04Q 5/0044; H04Q 11/0005; H04Q 2011/0086
See application file for complete search history.

(56) References Cited

U.S. PATENT DOCUMENTS

| 10,177,871 B2 | 1/2019 | Luo et al. |
| 2011/0142437 A1* | 6/2011 | Luo .................. H04J 3/0608 398/1 |

(Continued)

FOREIGN PATENT DOCUMENTS

| CN | 101534249 A * | 9/2009 |
| CN | 104836681 A | 8/2015 |

(Continued)

OTHER PUBLICATIONS

International Search Report for Application No. PCT/CN2020/126169, dated Jan. 27, 2021, 4 pages including English translation.
(Continued)

*Primary Examiner* — Darren E Wolf
(74) *Attorney, Agent, or Firm* — Morgan, Lewis & Bockius LLP

(57) ABSTRACT

Provided are a passive optical network (PON) multi-channel binding transmission method, a PON node and a storage medium. The PON multi-channel binding transmission method includes: determining a multi-channel transmission mode of to-be-sent data according to a data transmission efficiency and a preset data transmission efficiency threshold, where the data transmission efficiency for determining the multi-channel transmission mode is higher than or equal to the preset data transmission efficiency threshold; and transmitting the to-be-sent data on a data transmission channel binding combination of one or more data transmission channels according to the multi-channel transmission mode.

14 Claims, 4 Drawing Sheets

(56) References Cited

U.S. PATENT DOCUMENTS

2012/0039173 A1  2/2012 Danzig et al.
2017/0155983 A1  6/2017 Detwiler et al.
2017/0366329 A1  12/2017 Cao et al.

FOREIGN PATENT DOCUMENTS

CN  111601186 A  8/2020
EP  3537673 A1  9/2019

OTHER PUBLICATIONS

Supplementary European Search Report for Application No. 20908593, dated Jan. 17, 2024, 12 pages.

* cited by examiner

PON MULTI-CHANNEL BINDING TRANSMISSION METHOD, PON NODE AND STORAGE MEDIUM

CROSS-REFERENCES TO RELATED APPLICATIONS

This is a National Stage Application, filed under 35 U.S.C. 371, of International Patent Application No. PCT/CN2020/126169, filed on Nov. 3, 2020, which is based on and claims priority to Chinese Patent Application No. 201911424432.4 filed with the China National Intellectual Property Administration (CNIPA) on Dec. 31, 2019, the disclosure of which is incorporated herein by reference in its entirety.

TECHNICAL FIELD

The present application relates to an optical communication network, for example, a PON multi-channel binding transmission method, a PON node, and a storage medium.

BACKGROUND

A passive optical network (PON) is an optical fiber access network. In an optical distribution network (ODN), the PON does not include any active electronic devices and electronic light sources, and only consists of optical splitters and other passive devices. Compared with an active optical network, the PON saves resources and has relatively low costs so that the PON has been widely used.

To improve a data transmission bandwidth, a multi-channel binding technology is proposed in the PON. That is, multiple optical channels are bound together as one data transmission channel, thereby improving the channel capacity and peak rate and effectively reducing data transmission delay. However, in the case of multi-channel binding, when data is divided for transmission on multiple channels, the data on each channel needs to be encapsulated separately, and a frame header needs to be added for each encapsulation, so as to indicate a data transmission situation on each channel.

However, the frame header encapsulated on each channel occupies additional overhead so that the data transmission efficiency is affected, especially in the case where the transmitted data is relatively short, an effect on the data transmission efficiency is particularly apparent.

SUMMARY

The present application provides a PON multi-channel binding transmission method, a PON node, and a storage medium so that when multiple data transmission channel combination binding of a PON is performed, a data transmission efficiency and a data transmission rate are balanced, so as to satisfy data transmission requirements of a user.

An embodiment of the present application provides a passive optical network (PON) multi-channel binding transmission method. The method includes the following.

A multi-channel transmission mode of to-be-sent data is determined according to a data transmission efficiency and a preset data transmission efficiency threshold, where the data transmission efficiency for determining the multi-channel transmission mode is higher than or equal to the preset data transmission efficiency threshold.

The to-be-sent data is transmitted on a data transmission channel binding combination of one or more data transmission channels according to the multi-channel transmission mode.

An embodiment of the present application further provides a passive optical network (PON) node including a processor and a memory, where the processor is configured to execute program instructions stored in the memory to perform the PON multi-channel binding transmission method.

An embodiment of the present application provides a computer-readable storage medium storing a computer program which, when executed by a processor, performs the passive optical network (PON) multi-channel binding transmission method.

DETAILED DESCRIPTION

Embodiments of the present application are described hereinafter in detail in conjunction with drawings.

In the Institute of Electrical and Electronics Engineers (IEEE) Next Generation Ethernet Passive Optical Network (NGEPON) standard and the International Telecommunication Union-Telecommunication Standardization Sector High Speed PON (HS-PON) standard, a multi-channel binding solution has been developed. Multi-channel binding is performed in the PON so that the channel capacity and peak rate may be improved.

However, after the multi-channel binding, data on each channel needs to be encapsulated separately so that an independent frame header needs to be encapsulated on each channel, so as to indicate a data transmission situation on each channel. However, the frame header encapsulated on each channel occupies additional overhead so that the data transmission efficiency is affected. Especially in the case where the transmitted data is relatively short, an effect on the data transmission efficiency is particularly apparent. For example, the case where the to-be-sent data is 64 bytes and an encapsulation frame header is 8 bytes is as an example. If the data is sent on a single channel, the data transmission efficiency is $64/(64+8)=88.89\%$; if the data is sent on two channels, the data transmission efficiency is $64/(64+16)=80\%$; and if the data is sent on four channels, the data transmission efficiency is $64/(64+32)=66.67\%$. It can be seen that although the increase of data channels may increase the channel data capacity and transmission rate, the greater the number of the data channels is, the greater the effect on the data transmission efficiency is.

Figure 1:
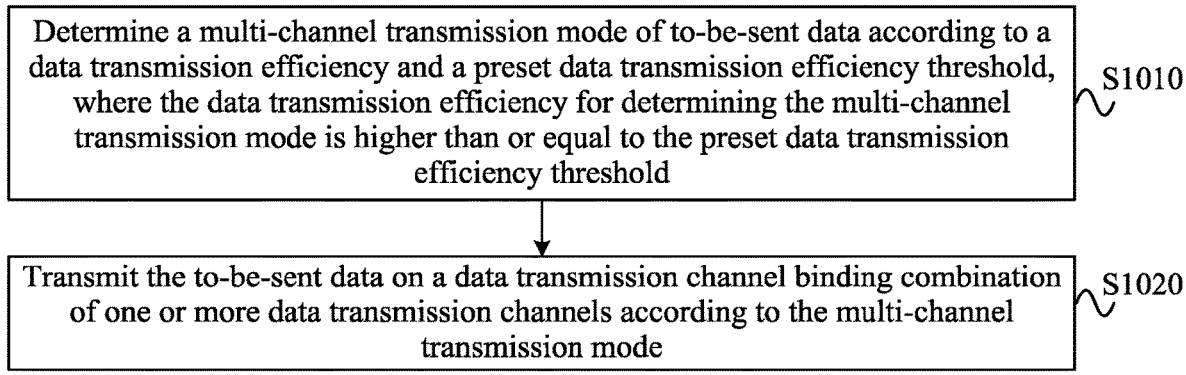
FIG. 1 is a flowchart of a PON multi-channel binding transmission method according to an embodiment.

FIG. 1 is a flowchart of a PON multi-channel binding transmission method according to an embodiment. As shown in FIG. 1, the method provided in this embodiment includes the following.

In S1010, a multi-channel transmission mode of to-be-sent data is determined according to a data transmission efficiency and a preset data transmission efficiency threshold, where the data transmission efficiency for determining the multi-channel transmission mode is higher than or equal to the preset data transmission efficiency threshold.

The PON multi-channel binding transmission method provided in this embodiment is applied to any node in the PON, including an optical line terminal (OLT), an optical network unit (ONU) or other network node for data transmission in the PON. Multiple data transmission channels may be established between nodes in the PON, and data transmission can be performed independently on each data transmission channel. Data transmitted in the PON is encapsulated in a form of data frames, where each data frame includes a frame header and data. A frame header of each data frame includes relevant information of the data frame so that a node receiving the data frame determines the length and other information of the data frame by analyzing information of the frame header, thereby achieving reception.

Figure 2:
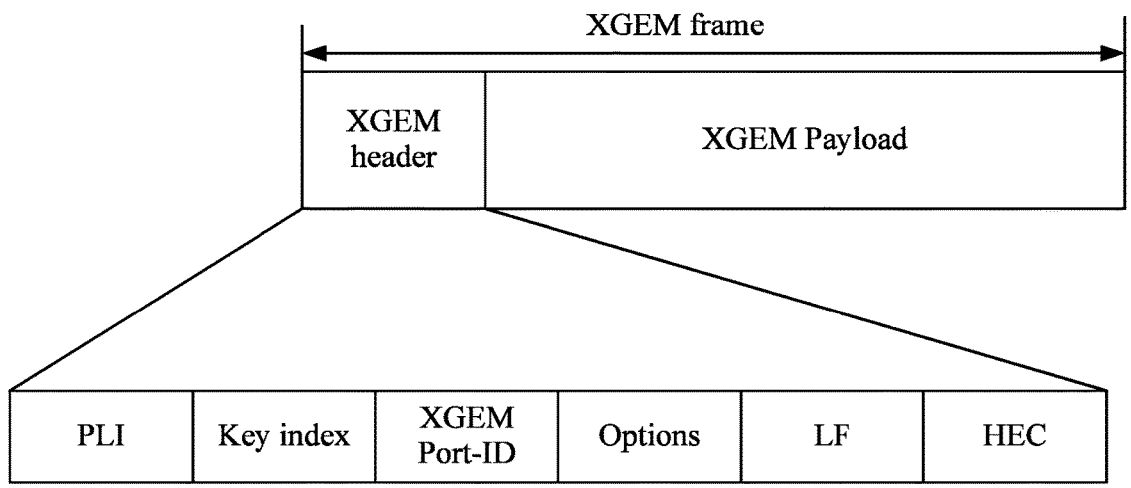
FIG. 2 is a diagram showing a data structure of an XGEM frame.

FIG. 2 is a diagram showing a data structure of an XG-Passive Optical Network Encapsulation Method (XGEM) frame. As shown in FIG. 2, an XGEM header includes multiple parts of contents, which are a 14-bit frame payload length indicator (PLI), a 2-bit key index, a 16-bit port identifier (XGEM Port-ID), 18-bit Options, a last fragment (LF) of a 1-bit fragmented frame, and 13-bit head error check (HEC), respectively. The XGEM payload is used for carrying to-be-transmitted data in the XGEM frame. It can be seen that the frame header of the XGEM frame needs a total of 64 bits, that is, the frame header of the XGEM frame needs to occupy 8 bytes. FIG. 2 is only a diagram showing the data structure of the XGEM frame. Another form of PON frame may also be divided into two parts: a frame header and a data field.

Since the capacity of each data transmission channel in the PON is limited, to improve the data channel capacity and data transmission rate in the PON, a multi-channel binding solution is proposed in which multiple data transmission channels are bound together for transmitting data together. However, when the to-be-transmitted data frame is transmitted through multiple bound data transmission channels, the data in the to-be-transmitted data frame needs to be divided and allocated on multiple data transmission channels for transmission. A frame header needs to be added to the divided data transmitted on each channel, and a new data frame is generated on each data transmission channel. At a data receiving terminal, after data frames are received from the bound data transmission channels, respectively, the divided data in each data frame is combined, so as to obtain to-be-transmitted data. Therefore, the frame header of the data frame respectively transmitted on each channel occupies additional data transmission opportunities, thereby affecting the data transmission efficiency. In the case where a length of the to-be-transmitted data is relatively short, multiple frame headers on multiple channels have a greater effect on the data transmission efficiency. Although the increase of data channels affects the data transmission efficiency, data transmission through multiple channels can increase the capacity of the data transmission channel and improve the data transmission rate, that is, shorten data transmission delay. However, in the multi-channel binding solution for the PON, the balance between the data transmission efficiency and the data transmission rate is not considered so that data transmission cannot satisfy user requirements.

In the present application, to balance the data transmission efficiency and the data transmission rate in the case of the PON multi-channel binding for data transmission, a method of dynamically binding the PON multi-channel is adopted. The multi-channel transmission mode for transmitting the to-be-sent data is determined according to the data transmission efficiency and the preset data transmission efficiency threshold of the multi-channel binding combination, where the determined multi-channel transmission mode includes a binding combination of one or more data transmission channels. The data transmission efficiency of the determined multi-channel transmission mode satisfies a preset condition. That is, the data transmission efficiency for determining the multi-channel transmission mode is higher than or equal to the preset data transmission efficiency threshold. The data transmission efficiency of the to-be-sent data may be set according to the user requirements or may be preset in a PON node. In an embodiment, the data transmission efficiency of the multi-channel transmission mode satisfying the preset condition further includes that the data transmission efficiency for determining the multi-channel transmission mode is lower than the preset data transmission efficiency threshold and the multi-channel transmission mode includes the smallest number of data transmission channels.

Therefore, the data transmission efficiency in the case where the to-be-sent data is transmitted on different data channel combinations in the PON needs to be counted first. The to-be-sent data may be transmitted on one data transmission channel or on multiple data transmission channels. If the to-be-sent data is transmitted on multiple data transmission channels, the to-be-sent data needs to be divided into at least two data units, where the at least two data units may be evenly allocated on multiple data transmission channels in the PON or may be allocated on multiple data transmission channels according to a preset allocation method. One or more data transmission channels are used for transmitting the at least two data units. The data transmission efficiency when the at least two data units are transmitted on multiple data transmission channels in the PON may be obtained according to a ratio of a data length of the to-be-sent data to data volume actually transmitted on each data transmission channel.

In an embodiment, the data transmission efficiency is counted based on a certain period, and a statistical period for counting the data transmission efficiency may be a preset time period, such as 24 hours or 15 minutes, or the statistical period may also be an uplink superframe or a downlink superframe. Alternatively, the statistical period may also be other preset durations.

The data transmission efficiency when the to-be-sent data is transmitted on multiple data transmission channels in the PON may be pre-counted before the to-be-sent data is transmitted or may be counted according to an actual transmission situation of the to-be-sent data after the to-be-sent data is transmitted within one statistical period.

In an embodiment, before the to-be-sent data is sent in each statistical period, multiple pre-counted data transmission efficiencies are pre-counted in the case where the to-be-sent data is allocated on multiple different data transmission channel combinations in the PON for transmission. That is, in each statistical period, for the to-be-sent-data, a pre-transmission channel is first determined for pre-transmission, and the data transmission efficiency is pre-counted. A combination form of pre-transmission channels is changed so that multiple different pre-counted data transmission efficiencies are counted. For example, four data transmission channels for transmitting the to-be-sent data are provided. After the four data transmission channels are arranged and combined, a total of 15 data transmission channel combinations can be obtained, and then at least two data units of the to-be-sent data are pre-sent on the 15 data transmission channel combinations, respectively, so as to obtain a pre-counted data transmission efficiency corresponding to each data transmission channel combination. The pre-counted data transmission efficiency is not obtained after the to-be-sent data is actually sent on the data transmission channel, but is calculated according to a parameter of the data transmission channel combination and a size of the to-be-sent data.

In an embodiment, after the to-be-sent data is sent in each statistical period, the data transmission efficiency is counted after the to-be-sent data is transmitted on multiple data transmission channels in the PON. That is, in each statistical period, after the to-be-sent data is sent according to the determined data transmission channel binding combination, the actual data transmission efficiency is counted. The determined data transmission channel binding combination here may be determined according to the data transmission efficiency counted in a previous statistical period or may be determined according to a preset strategy.

To balance the data transmission efficiency and the data transmission rate of transmitting the to-be-sent data, the preset data transmission efficiency threshold is required. The preset data transmission efficiency threshold is set according to data transmission requirements. If an actual data transmission efficiency is higher than or equal to the preset data transmission efficiency threshold, in the case where the to-be-sent data is transmitted on a data transmission channel combination corresponding to the data transmission efficiency, the data transmission efficiency satisfies data transmission efficiency requirements so that the data may be transmitted on the data transmission channel combination. If the data transmission efficiency is lower than the preset data transmission efficiency threshold, in the case where the to-be-sent data is transmitted on the data transmission channel combination corresponding to the data transmission efficiency, the data transmission efficiency cannot satisfy the requirements so that the data transmission channel combination for transmitting the to-be-sent data needs to be adjusted, thereby reducing the number of data transmission channels and improving the data transmission efficiency.

A strategy for determining the data transmission channel binding combination is as follows: in the case where the data transmission efficiency of the data transmission channel binding combination is higher than or equal to the preset data transmission efficiency threshold, the data transmission channel binding combination includes the largest number of data transmission channels; or in the case where the data transmission efficiency of the data transmission channel binding combination is lower than the preset data transmission efficiency threshold, the data transmission channel binding combination includes the smallest number of data transmission channels. That is, on the premise that the preset data transmission efficiency threshold is satisfied, the data transmission channel binding combination with the largest number of data transmission channels is used for transmitting the to-be-sent data, so as to improve the data transmission rate as much as possible; or on the premise that the data transmission efficiency cannot satisfy the preset data transmission efficiency threshold, the data transmission efficiency is improved as much as possible.

In an embodiment, if multiple pre-counted data transmission efficiencies in the case where the to-be-sent data is allocated on multiple different data transmission channel combinations in the PON for transmission are pre-counted before the to-be-sent data is sent in each statistical period, then the data transmission channel binding combination with the pre-counted data transmission efficiency higher than or equal to the preset data transmission efficiency threshold and the largest number of data transmission channels is determined and selected to transmit the to-be-sent data, or the data transmission channel binding combination with the preset-counted data transmission efficiency lower than the preset data transmission efficiency threshold and the smallest number of data transmission channels is determined and selected to transmit the to-be-sent data. That is, before the to-be-sent data is not transmitted, for example, in a first statistical period of transmitting the to-be-sent data, multiple pre-counted data transmission efficiencies are pre-counted, and then the multiple pre-counted data transmission efficiencies are respectively compared with the preset data transmission efficiency threshold. First, whether among the multiple pre-counted data transmission efficiencies, a pre-counted data transmission efficiency higher than or equal to the preset data transmission efficiency threshold exists. If exists, among data transmission channel binding combinations, a combination with the largest number of data transmission channels is selected to transmit the to-be-sent data. Alternatively, if among the multiple pre-counted data transmission efficiencies, no pre-counted data transmission efficiency higher than or equal to the preset data transmission efficiency threshold exists, then among the data transmission channel binding combinations, a combination with the smallest number of data transmission channels is selected to transmit the to-be-sent data. In this manner, the balance between the data transmission efficiency and the data transmission rate may be achieved, thereby achieving optimal transmission of the to-be-sent data.

In an embodiment, if the data transmission efficiency after the to-be-sent data is transmitted on multiple data transmission channels in the PON are counted before the to-be-sent data is sent in each statistical period, then in the case where the data transmission efficiency is higher than or equal to the preset data transmission efficiency threshold, the data transmission channel binding combination with the largest number of data transmission channels is determined and selected to transmit the to-be-sent data, or in the case where the data transmission efficiency is lower than the preset data transmission efficiency threshold, the data transmission channel binding combination with the smallest number of data transmission channels is determined and selected to transmit the to-be-sent data. That is, after the to-be-sent data is transmitted in one statistical period, the actual data transmission efficiency is counted, and then whether the data transmission efficiency is higher than or equal to the preset data transmission efficiency threshold is determined. If so, the data transmission channel binding combination with the largest number of data transmission channels may be selected to transmit the to-be-sent data; and if the data transmission efficiency is lower than the preset data transmission efficiency threshold, the data transmission channel binding combination with the smallest number of data transmission channels is selected to transmit the to-be-sent data. In this manner, the balance between the data transmission efficiency and the data transmission rate may be achieved, thereby achieving optimal transmission of the to-be-sent data.

In an embodiment, after the to-be-sent data is sent in each statistical period, the data transmission efficiency is counted after the to-be-sent data is transmitted on multiple data transmission channels in the PON. Therefore, in the case where the data transmission efficiency is higher than or equal to the preset data transmission efficiency threshold, data transmission channels in the data transmission channel binding combination for transmitting the to-be-sent data are increased; or in the case where the data transmission efficiency is lower than the preset data transmission efficiency threshold, data transmission channels in the data transmission channel binding combination for transmitting the to-be-sent data are decreased. That is, after the to-be-sent data is transmitted in one statistical period, the actual data transmission efficiency is counted, and then whether the data transmission efficiency is higher than or equal to the preset data transmission efficiency threshold is determined. If so, when the to-be-sent data is transmitted in a next statistical period, the data transmission channels in the data transmission channel binding combination for transmitting the to-be-sent data are increased; and if the data transmission efficiency is lower than the preset data transmission efficiency threshold, then when the to-be-sent data is transmitted in a next statistical period, the data transmission channels in the data transmission channel binding combination for transmitting the to-be-sent data is decreased. In this manner, the data transmission channel binding combination of the to-be-sent data may be dynamically adjusted, so as to achieve the balance between the data transmission efficiency and the data transmission rate, thereby achieving optimal transmission of the to-be-sent data.

In an embodiment, if the data transmission efficiency is not counted before the start of the statistical period, the data transmission efficiency is determined according to the data transmission strategy. In the case where the data transmission strategy is a transmission efficiency priority, it is determined that the data transmission efficiency is lower than the preset data transmission efficiency threshold, and in the case where the data transmission strategy is a transmission delay priority, it is determined that the data transmission efficiency is higher than the preset data transmission efficiency threshold. Therefore, the data transmission channel binding combination for transmitting the to-be-sent data may be determined according to the data transmission strategy so that the data transmission channel binding combination is determined according to a preset data transmission strategy before the statistics of the data transmission efficiency are performed.

In S1020, the to-be-sent data is transmitted on a data transmission channel binding combination of one or more data transmission channels according to the multi-channel transmission mode.

After the multi-channel transmission mode of the to-be-sent data is determined, the to-be-sent data may be transmitted on the data transmission channel binding combination of one or more data transmission channels of the multi-channel transmission mode. Since the data transmission efficiency of the determined multi-channel transmission mode satisfies the preset condition, after the to-be-sent data is transmitted according to the determined multi-channel transmission mode, the balance between the data transmission efficiency and the data transmission rate is achieved, thereby satisfying requirements of the user for data transmission.

In the PON multi-channel binding transmission method provided in this embodiment, the multi-channel transmission mode of the to-be-sent data is determined according to the data transmission efficiency and the preset data transmission efficiency threshold, where the data transmission efficiency for determining the multi-channel transmission mode is higher than or equal to the preset data transmission efficiency threshold, and then the to-be-sent data is transmitted on the data transmission channel binding combination of one or more data transmission channels according to the multi-channel transmission mode so that when multiple data transmission channel combination binding of the PON is performed, the data transmission efficiency and the data transmission rate are balanced, so as to satisfy data transmission requirements of the user.

Figure 3:
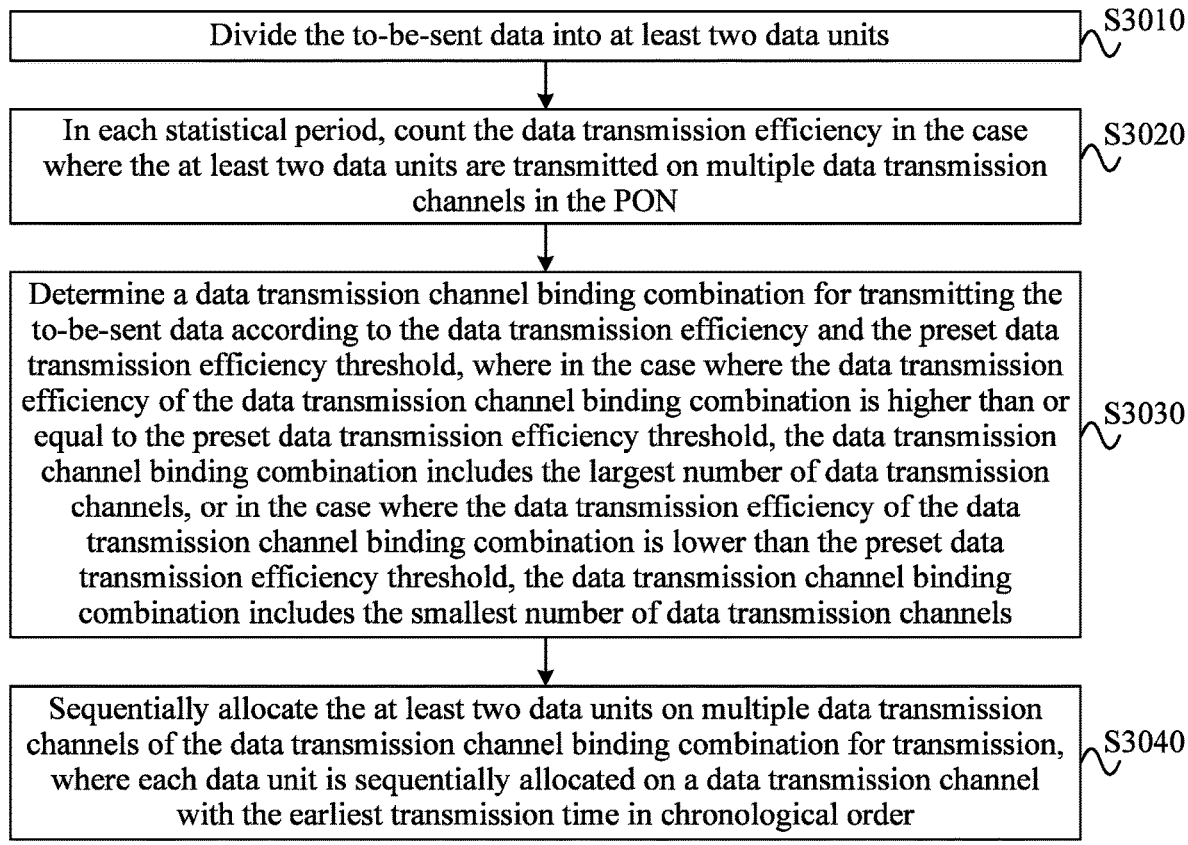
FIG. 3 is a flowchart of another PON multi-channel binding transmission method according to an embodiment.

FIG. 3 is a flowchart of another PON multi-channel binding transmission method according to an embodiment. As shown in FIG. 3, the method provided in this embodiment includes the following.

In S3010, the to-be-sent data is divided into at least two data units.

In S3020, in each statistical period, the data transmission efficiency in the case where the at least two data units are transmitted on multiple data transmission channels in the PON is counted.

In S3030, a data transmission channel binding combination for transmitting the to-be-sent data is determined according to the data transmission efficiency and the preset data transmission efficiency threshold, where in the case where the data transmission efficiency of the data transmission channel binding combination is higher than or equal to the preset data transmission efficiency threshold, the data transmission channel binding combination includes the largest number of data transmission channels, or in the case where the data transmission efficiency of the data transmission channel binding combination is lower than the preset data transmission efficiency threshold, the data transmission channel binding combination includes the smallest number of data transmission channels.

In S3040, at least two data units are sequentially allocated on multiple data transmission channels of the data transmission channel binding combination for transmission, where each data unit is sequentially allocated on a data transmission channel with the earliest transmission time in chronological order.

In the PON multi-channel binding transmission method in the embodiment shown in FIG. 1, the following is proposed: the multi-channel transmission mode of the to-be-sent data is determined according to the data transmission efficiency and the preset data transmission efficiency threshold, and then the to-be-sent data is transmitted on the data transmission channel binding combination of one or more data transmission channels according to the multi-channel transmission mode. After the data transmission channel binding combination is determined, the to-be-sent data further needs to be allocated on multiple data transmission channels in the determined data transmission channel binding combination.

If the to-be-sent data is not divided, the allocation method of the to-be-sent data does not need to be determined, and if the to-be-sent data is divided into at least two data units, the at least two data units need to be allocated on multiple data transmission channels of the data transmission channel binding combination according to a certain rule so that after receiving the at least two data units on the multiple data transmission channels, the receiving terminal may combine the at least two data units into the to-be-sent data according to the same rule. In this embodiment, the at least two data units are sequentially allocated on multiple data transmission channels of the data transmission channel binding combination for transmission, where each data unit is sequentially allocated on a data transmission channel with the earliest transmission time in chronological order. If the earliest sent data exists on multiple data transmission channels, a channel with the smallest number (or with the largest number) among the data transmission channels may be selected. Therefore, the data receiving terminal may sequentially arrange and combine the data units according to the time when each data unit is received. Other methods may also be used for the allocation of the at least two data units, as long as at least the allocation of the at least two data units on multiple data channels can be uniquely determined.

Figure 4:
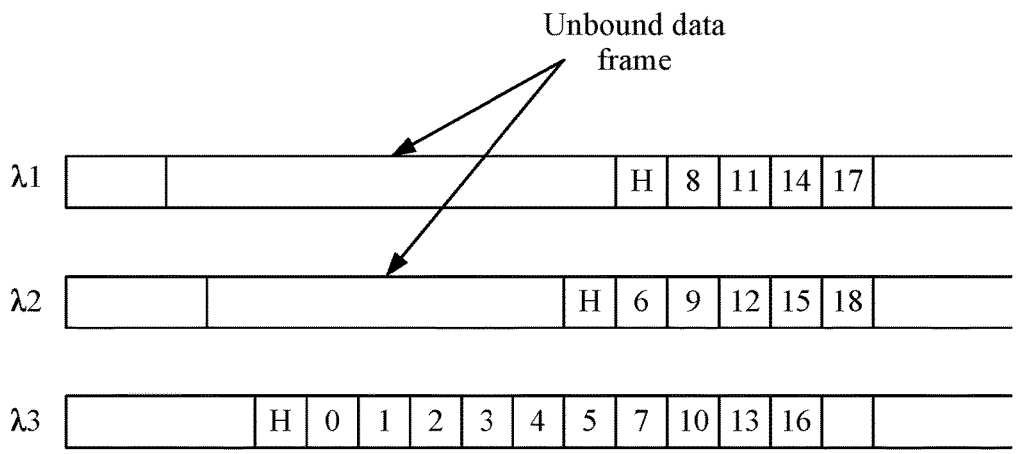
FIG. 4 is a diagram showing data unit allocation performed through a PON multi-channel binding transmission method according to an embodiment.

As shown in FIG. 4, FIG. 4 is a diagram showing data unit allocation performed through a PON multi-channel binding transmission method according to an embodiment. In FIG. 4, the case where the data transmission channel combination includes three data transmission channels is used as an example, where wavelengths of the three data transmission channels are $\lambda 1$, $\lambda 2$, and $\lambda 3$, respectively. The transmission channels with wavelengths of $\lambda 1$ and $\lambda 2$ both include unbound data frame transmission. In this embodiment, the to-be-sent data is divided into 19 data units from 0 to 18 in total. In the case where the to-be-sent data is determined to be transmitted on the three data transmission channels, first, a frame header (H) is added to each transmission channel, and then each data unit is sequentially transmitted on a data transmission channel with the earliest transmission time among the three data transmission channels. As shown in FIG. 4, a total of six data units from 0 to 5 are sequentially sent on the transmission channel with a wavelength of $\lambda 3$. For a data unit numbered 6, the data transmission channels with the earliest transmission time are data transmission channels with wavelengths of $\lambda 2$ and $\lambda 3$, and then the data unit numbered 6 is sent on the data transmission channel with a wavelength of $\lambda 2$, which is a smaller number. For a data unit numbered 7, the data transmission channel with the earliest transmission time is the data transmission channel with a wavelength of $\lambda 3$, and then the data unit numbered 7 is sent on the data transmission channel with a wavelength of $\lambda 3$. Data units numbered 8 to 18 are sequentially sent on the data transmission channel with the wavelengths of $\lambda 1$ to $\lambda 3$ according to the same method.

In an embodiment, after the data transmission channel binding combination for transmitting the to-be-sent data is determined according to the data transmission efficiency and the preset data transmission efficiency threshold, the method further includes adding a data channel binding indication to a data frame header of each data transmission channel in the data transmission channel binding combination.

In the PON multi-channel binding transmission method provided in the embodiment of the present application, the to-be-sent data is divided into multiple data units and transmitted on multiple data transmission channels, and in order that the receiving terminal can correctly receive the data units on the multiple data transmission channels, the data channel binding indication needs to be added to the frame header. The data channel binding indication is used for indicating which data transmission channels form the data transmission channel binding combination for transmitting the to-be-sent data. The data channel binding indication may be indicated by using an identifier of the data transmission channel, or the data channel binding indication may also be that whether the data units are transmitted on the multiple data transmission channels is indicated by using multiple bits.

Figure 5:
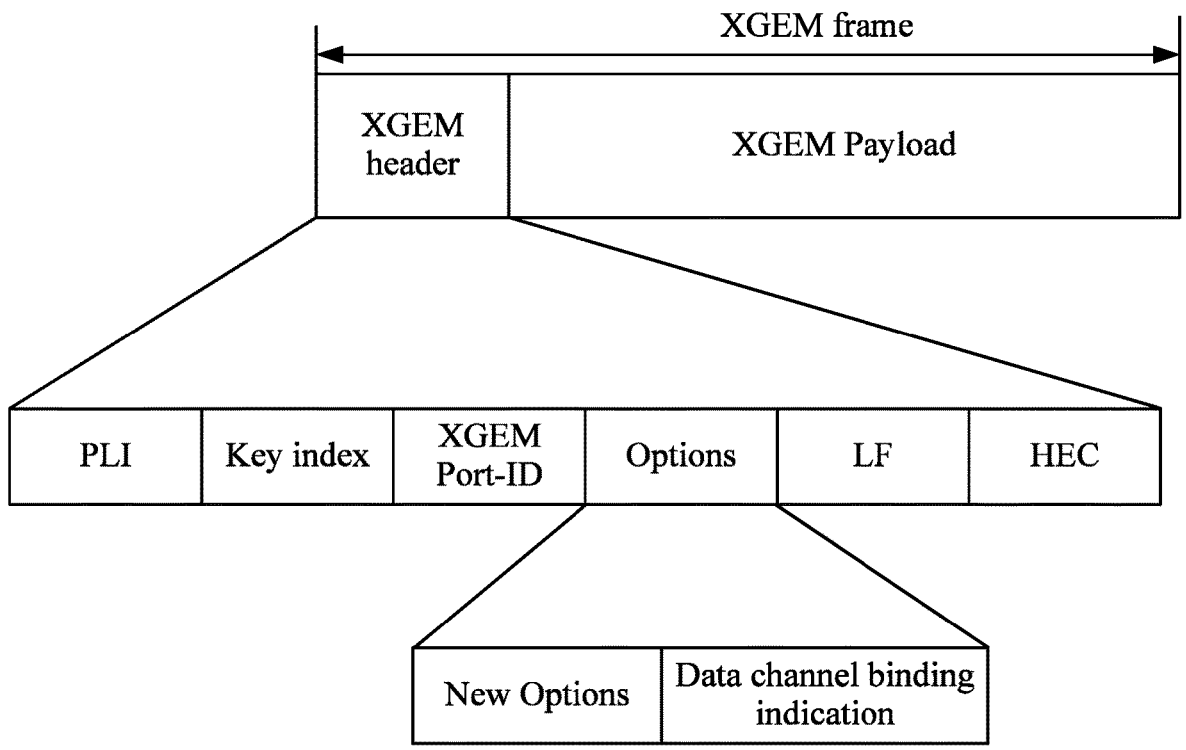
FIG. 5 is a diagram showing a data structure of a modified XGEM frame transmitted through a PON multi-channel binding transmission method according to an embodiment of the present application.

FIG. 5 is a diagram showing a data structure of a modified XGEM frame transmitted through a PON multi-channel binding transmission method according to an embodiment of the present application. As shown in FIG. 5, in the case where the XGEM frame is determined to be transmitted on multiple data transmission channels of the data transmission channel binding combination, the data channel binding indication needs to be added to the frame header of the XGEM frame. On the basis of the frame header of the XGEM frame shown in FIG. 2, the frame header includes 18-bits Options, and then the data channel binding indication may be placed in the Options. For example, four data transmission channels are provided for the PON node to send the to-be-sent data, 4 bits in the Options may be segmented for carrying the data channel binding indication, and the remaining 14 bits are used as New Options. In the segmented 4 bits, each bit corresponds to a case of transmitting the data unit on one data transmission channel. For example, if the bit corresponding to the data transmission channel is 1, it indicates that the data is transmitted on the data transmission channel corresponding to the bit; and if the bit corresponding to the data transmission channel is 0, it indicates that the data is not transmitted on the data transmission channel corresponding to the bit. Therefore, the data receiving terminal may analyze the 4 bits, so as to determine the data transmission channel binding combination, thereby correctly completing the data reception.

Figure 6:
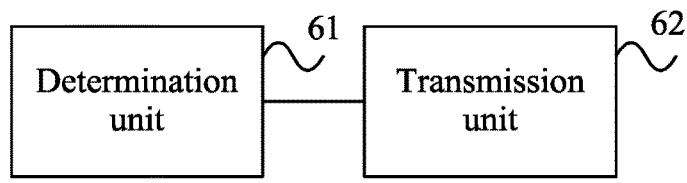
FIG. 6 is a structural diagram of a PON multi-channel binding transmission apparatus according to an embodiment.

FIG. 6 is a structural diagram of a PON multi-channel binding transmission apparatus according to an embodiment. As shown in FIG. 6, the PON multi-channel binding transmission apparatus provided in this embodiment includes a determination unit 61 and a transmission unit 62.

The determination unit 61 is configured to determine a multi-channel transmission mode of to-be-sent data according to a data transmission efficiency and a preset data transmission efficiency threshold, where the data transmission efficiency for determining the multi-channel transmission mode is higher than or equal to the preset data transmission efficiency threshold. The transmission unit 62 is configured to transmit the to-be-sent data on a data transmission channel binding combination of one or more data transmission channels according to the multi-channel transmission mode.

The PON multi-channel binding transmission apparatus provided in this embodiment is configured to perform the PON multi-channel binding transmission method in the embodiment shown in FIG. 1, and the PON multi-channel binding transmission apparatus and the PON multi-channel binding transmission method have similar implementation principles and technical effects, which are not repeated here.

Figure 7:
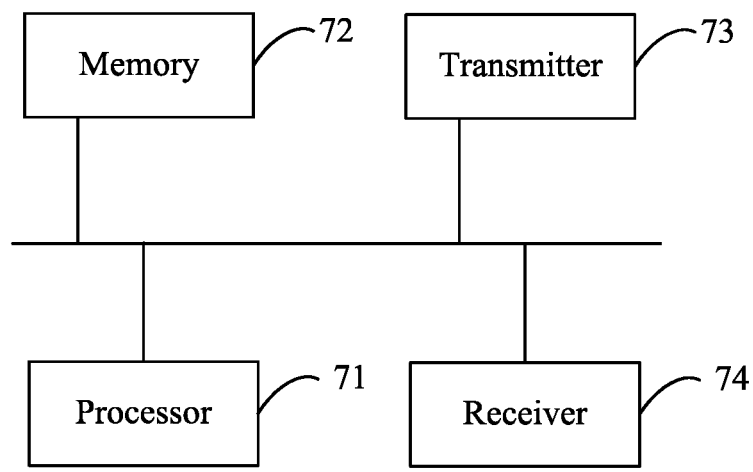
FIG. 7 is a structural diagram of a PON node according to an embodiment.

FIG. 7 is a structural diagram of a PON node according to an embodiment. As shown in FIG. 7, the PON node includes a processor 71, a memory 72, a transmitter 73, and a receiver 74. One or more processors 71 may be provided in the PON node, and one processor 71 is used as an example in FIG. 7. The processor 71 and the memory 72, the transmitter 73 and the receiver 74 in the PON node may be connected via a bus or in other manners. In FIG. 7, the connection via the bus is used as an example.

As a computer-readable storage medium, the memory 72 may be configured to store software programs, computer-executable programs and modules, such as program instructions/modules (for example, the determination unit 61 and the transmission unit 62 in the PON multi-channel binding transmission apparatus) corresponding to the PON multi-channel binding transmission method in the embodiments of FIGS. 1 and 3 of the present application. The processor 71 runs the software programs, instructions and modules stored in the memory 72 to execute at least one function application and data processing of the PON node, that is, to perform the PON multi-channel binding transmission method.

The memory 72 may mainly include a program storage area and a data storage area. The program storage area may store an operating system and an application program required for implementing at least one function while the data storage area may store data created depending on use of the PON node. In addition, the memory 72 may include a high-speed random-access memory, and may also include a nonvolatile memory such as at least one disk memory, flash memory or other nonvolatile solid-state memories.

The transmitter 73 is a module or device combination capable of data transmission in the PON, for example, including an optical signal transmission module. The receiver 74 is a module or device combination capable of data reception in the PON, for example, including an optical signal receiving module.

An embodiment of the present application further provides a storage medium including computer-executable instructions, where when executed by a computer processor, the computer-executable instructions are used for performing a PON multi-channel binding transmission method. The method includes determining a multi-channel transmission mode of to-be-sent data according to a data transmission efficiency and a preset data transmission efficiency threshold, where the data transmission efficiency for determining the multi-channel transmission mode is higher than or equal to the preset data transmission efficiency threshold; and transmitting the to-be-sent data on a data transmission channel binding combination of one or more data transmission channels according to the multi-channel transmission mode.

The above are only exemplary embodiments of the present application and are not intended to limit the protection scope of the present application.

It is to be understood by those skilled in the art that the term "user terminal" covers any suitable type of radio UE, for example, a mobile phone, a portable data processing apparatus, a portable web browser or a vehicle-mounted mobile station.

In general, multiple embodiments of the present application may be implemented in hardware or dedicated circuits, software, logics or any combination thereof. For example, some aspects may be implemented in hardware while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented using any suitable data storage technology, such as, but not limited to, a read-only memory (ROM), a random-access memory (RAM) and an optical memory device and system (a digital video disc (DVD) or a compact disc (CD)). The computer-readable medium may include a non-transitory storage medium. The data processor may be of any type suitable for the local technical environment, such as, but not limited to, a general-purpose computer, a special-purpose computer, a microprocessor, a digital signal processor (DSP), an application specific integrated circuit (ASIC), a field-programmable gate array (FPGA), and a processor based on a multi-core processor architecture.

What is claimed is:

1. A passive optical network (PON) multi-channel binding transmission method, comprising:
    determining a multi-channel transmission mode of to-be-sent data according to a data transmission efficiency and a preset data transmission efficiency threshold; and
    transmitting the to-be-sent data on a data transmission channel binding combination according to the multi-channel transmission mode, wherein the data transmission channel binding combination comprises at least one data transmission channel;
    wherein transmitting the to-be-sent data on the data transmission channel binding combination comprising at least one data transmission channel according to the multi-channel transmission mode comprises:
    sequentially allocating the to-be-sent data for transmission on a plurality of data transmission channels in the data transmission channel binding combination, wherein each data unit is sequentially allocated on a respective one of the plurality of data transmission channels in an order of transmission time of the plurality of data transmission channels from early to late.

2. The method of claim 1, wherein the data transmission efficiency is counted based on a statistical period.

3. The method of claim 2, wherein the statistical period comprises a preset duration or a preset number of superframes.

4. The method of claim 1, wherein the data transmission efficiency for determining the multi-channel transmission mode is higher than or equal to the preset data transmission efficiency threshold; or
    the data transmission efficiency for determining the multi-channel transmission mode is lower than the preset data transmission efficiency threshold and the data transmission channel binding combination of the multi-channel transmission mode comprises a smallest number of data transmission channels.

5. The method of claim 4, wherein the determining the multi-channel transmission mode of the to-be-sent data according to the data transmission efficiency and the preset data transmission efficiency threshold comprises:
    before the to-be-sent data is sent in each statistical period, pre-counting a plurality of pre-counted data transmission efficiencies in a case where the to-be-sent data is allocated on a plurality of different data transmission channel binding combinations in the PON for transmission; and
    selecting one data transmission channel binding combination of the plurality of different data transmission channel binding combinations with a pre-counted data transmission efficiency higher than or equal to the preset data transmission efficiency threshold and a largest number of data transmission channels to transmit the to-be-sent data, or selecting one data transmission channel binding combination of the plurality of different data transmission channel binding combinations with a pre-counted data transmission efficiency lower than the preset data transmission efficiency threshold and a smallest number of data transmission channels to transmit the to-be-sent data.

6. The method of claim 4, wherein the determining the multi-channel transmission mode of the to-be-sent data according to the data transmission efficiency and the preset data transmission efficiency threshold comprises:
after the to-be-sent data is sent in each statistical period, counting a data transmission efficiency after the to-be-sent data is transmitted on a plurality of data transmission channels in the PON; and
in a case where the data transmission efficiency is higher than or equal to the preset data transmission efficiency threshold, selecting a data transmission channel binding combination with a largest number of data transmission channels to transmit the to-be-sent data, or in a case where the data transmission efficiency is lower than the preset data transmission efficiency threshold, selecting a data transmission channel binding combination with a smallest number of data transmission channels to transmit the to-be-sent data.

7. The method of claim 4, wherein the determining the multi-channel transmission mode of the to-be-sent data according to the data transmission efficiency and the preset data transmission efficiency threshold comprises:
after the to-be-sent data is sent in each statistical period, counting a data transmission efficiency after the to-be-sent data is transmitted on a plurality of data transmission channels in the PON; and
in a case where the data transmission efficiency is higher than or equal to the preset data transmission efficiency threshold, increasing a number of data transmission channels in the data transmission channel binding combination for transmitting the to-be-sent data; or in a case where the data transmission efficiency is lower than the preset data transmission efficiency threshold, decreasing a number of data transmission channels in the data transmission channel binding combination for transmitting the to-be-sent data.

8. The method of claim 6, wherein before the multi-channel transmission mode of the to-be-sent data is determined according to the data transmission efficiency and the preset data transmission efficiency threshold, the method further comprises:
before the statistical period starts and in a case where the data transmission efficiency is not counted, determining the data transmission efficiency according to a data transmission strategy, wherein in a case where the data transmission strategy is a transmission efficiency priority, the data transmission efficiency is determined to be lower than the preset data transmission efficiency threshold, and in a case where the data transmission strategy is a transmission delay priority, the data transmission efficiency is determined to be higher than or equal to the preset data transmission efficiency threshold.

9. The method of claim 1, wherein after the multi-channel transmission mode of the to-be-sent data is determined according to the data transmission efficiency and the preset data transmission efficiency threshold, the method further comprises:
adding a data channel binding indication to a data frame header of each of the plurality of data transmission channels in the data transmission channel binding combination.

10. The method of claim 2, wherein the data transmission efficiency for determining the multi-channel transmission mode is higher than or equal to the preset data transmission efficiency threshold; or
the data transmission efficiency for determining the multi-channel transmission mode is lower than the preset data transmission efficiency threshold and the data transmission channel binding combination of the multi-channel transmission mode comprises a smallest number of data transmission channels.

11. The method of claim 3, wherein the data transmission efficiency for determining the multi-channel transmission mode is higher than or equal to the preset data transmission efficiency threshold; or
the data transmission efficiency for determining the multi-channel transmission mode is lower than the preset data transmission efficiency threshold and the data transmission channel binding combination of the multi-channel transmission mode comprises a smallest number of data transmission channels.

12. The method of claim 7, wherein before the multi-channel transmission mode of the to-be-sent data is determined according to the data transmission efficiency and the preset data transmission efficiency threshold, the method further comprises:
before the statistical period starts and in a case where the data transmission efficiency is not counted, determining the data transmission efficiency according to a data transmission strategy, wherein in a case where the data transmission strategy is a transmission efficiency priority, the data transmission efficiency is determined to be lower than the preset data transmission efficiency threshold, and in a case where the data transmission strategy is a transmission delay priority, the data transmission efficiency is determined to be higher than or equal to the preset data transmission efficiency threshold.

13. A passive optical network (PON) node, comprising a processor and a memory, wherein the processor is configured to execute program instructions stored in the memory to perform:
determining a multi-channel transmission mode of to-be-sent data according to a data transmission efficiency and a preset data transmission efficiency threshold; and
transmitting the to-be-sent data on a data transmission channel binding combination according to the multi-channel transmission mode, wherein the data transmission channel binding combination comprises at least one data transmission channel;
wherein transmitting the to-be-sent data on the data transmission channel binding combination comprising at least one data transmission channel according to the multi-channel transmission mode comprises:
sequentially allocating the to-be-sent data for transmission on a plurality of data transmission channels in the data transmission channel binding combination, wherein each data unit is sequentially allocated on a respective one of the plurality of data transmission channels in an order of transmission time of the plurality of data transmission channels from early to late.

14. A non-transitory computer-readable storage medium storing a computer program which, when executed by a processor, performs:
determining a multi-channel transmission mode of to-be-sent data according to a data transmission efficiency and a preset data transmission efficiency threshold; and transmitting the to-be-sent data on a data transmission channel binding combination according to the multi-channel transmission mode, wherein the data transmission channel binding combination comprises at least one data transmission channel;

wherein transmitting the to-be-sent data on the data transmission channel binding combination comprising at least one data transmission channel according to the multi-channel transmission mode comprises:

sequentially allocating the to-be-sent data for transmission on a plurality of data transmission channels in the data transmission channel binding combination, wherein each data unit is sequentially allocated on a respective one of the plurality of data transmission channels in an order of transmission time of the plurality of data transmission channels from early to late.

* * * * *